(12) United States Patent
Barbaresi et al.

(10) Patent No.: US 8,190,409 B2
(45) Date of Patent: May 29, 2012

(54) METHOD FOR SIMULATING COMMUNICATION NETWORKS, RELATED SIMULATOR, COMMUNICATION NETWORK, AND COMPUTER PROGRAM PRODUCT

(75) Inventors: Andrea Barbaresi, Turin (IT); Paolo Goria, Turin (IT); Enrico Zucca, Turin (IT)

(73) Assignee: Telecom Italia S.p.A., Milan (IT)

( * ) Notice: Subject to any disclaimer, the term of this patent is extended or adjusted under 35 U.S.C. 154(b) by 761 days.

(21) Appl. No.: 10/582,966

(22) PCT Filed: Dec. 18, 2003

(86) PCT No.: PCT/IT03/00833
§ 371 (c)(1),
(2), (4) Date: Jun. 15, 2006

(87) PCT Pub. No.: WO2005/060293
PCT Pub. Date: Jun. 30, 2005

(65) Prior Publication Data
US 2007/0147296 A1    Jun. 28, 2007

(51) Int. Cl.
*G06F 17/50* (2006.01)
*G06F 7/60* (2006.01)
*G06F 15/173* (2006.01)
*G06F 15/177* (2006.01)
*G06G 7/48* (2006.01)
*G01R 31/08* (2006.01)
*H04L 12/42* (2006.01)

(52) U.S. Cl. ............ 703/6; 370/231; 370/252; 370/349; 370/389; 455/423; 455/446; 455/456.1; 455/501; 703/1; 703/2; 703/13; 709/226; 715/735

(58) Field of Classification Search .................. 703/6, 1, 703/2, 13; 455/3.01, 423, 446, 456.1, 501; 370/231, 252, 349, 389; 709/226; 715/735
See application file for complete search history.

(56) References Cited

U.S. PATENT DOCUMENTS
5,809,282 A * 9/1998 Cooper et al. ............... 709/226
(Continued)

FOREIGN PATENT DOCUMENTS
EP    1 359 780    11/2003
(Continued)

OTHER PUBLICATIONS

Barbaresi et al. WO 02/104055: "System and Method for Simulating the Behaviour of a Network for Mobile Radio Apparatus" Dec. 27, 2002.*

(Continued)

*Primary Examiner* — Shambhavi Patel
(74) *Attorney, Agent, or Firm* — Finnegan, Henderson, Farabow, Garrett & Dunner, L.L.P.

(57) ABSTRACT

A communication network is simulated with a simulator with object based architecture in which each object represents the model of a network device. The simulated network is capable of corresponding to a plurality of different systems, such as, GSM, GPRS, UMTS, WLAN, fixed networks. At the simulator level, the physical devices of the network are subdivided into a first set of devices completely independent of the system that regulates the operation of the network, the operation of the devices of the first set thus being independent of the system, a second set of devices which depend on the system under consideration, the operation of the devices included in the second set thus being specific for the system under consideration, and a third set of devices for the inter-work between the first set and second set, the devices of the third set being able to interact with the devices independent of the system under consideration and with the devices which do depend on the system under consideration.

17 Claims, 7 Drawing Sheets

U.S. PATENT DOCUMENTS

| | | | |
|---|---|---|---|
| 6,625,454 B1 * | 9/2003 | Rappaport et al. | 455/446 |
| 6,771,957 B2 * | 8/2004 | Chitrapu | 455/423 |
| 6,775,552 B2 * | 8/2004 | Link, II | 455/456.1 |
| 6,826,259 B2 * | 11/2004 | Hoffman | 379/10.03 |
| 6,917,621 B1 * | 7/2005 | Silver | 370/401 |
| 6,950,665 B2 * | 9/2005 | Swift et al. | 455/501 |
| 7,085,697 B1 * | 8/2006 | Rappaport et al. | 703/13 |
| 7,107,049 B2 * | 9/2006 | Barberis et al. | 455/423 |
| 7,218,620 B2 * | 5/2007 | Lee | 370/329 |
| 7,263,471 B2 * | 8/2007 | Barbaresi et al. | 703/2 |
| 7,286,802 B2 * | 10/2007 | Beyme et al. | 455/67.14 |
| 7,561,876 B2 * | 7/2009 | Chiou et al. | 455/423 |
| 8,090,563 B2 * | 1/2012 | Barbaresi et al. | 703/13 |
| 2003/0061017 A1 | 3/2003 | Dotaro et al. | |
| 2006/0073821 A1 * | 4/2006 | Rantapuska | 455/423 |
| 2007/0014263 A1 * | 1/2007 | Ferrato et al. | 370/335 |
| 2007/0097868 A1 * | 5/2007 | Bizzarri et al. | 370/241 |

FOREIGN PATENT DOCUMENTS

| | | |
|---|---|---|
| WO | WO 01/54350 | 7/2001 |
| WO | WO 02/104055 | 12/2002 |

OTHER PUBLICATIONS

Zheng et al. "Experiences in Building a Scalable Distributed Network Emulation System", Proceedings of the Ninth International Conference on Parallel and Distributed Systems (ICPADS'02).*

Boukerche et al. "SWiMNet: A Scalable Parallel Simulation Testbed forWireless and Mobile Networks", Wireless Networks 7, 467-486, 2001.*

Wellington et al. "Wireless Network Emulation for Distributed Processing Systems", IEEE 2003.*

Alsolaim, Ahmad. "Dynamically Reconfigurable Architecture for Third Generation Mobile Systems", Aug. 2002.*

Kojo et al. "Seawind: a Wireless Network Emulator", In Proceedings of 11th Conference on Measuring, Modelling and Evaluation of Computer and Communication Systems (Sep. 2001).*

Herrscher et al. "A Dynamic Network Scenario Emulation Tool", IEEE 2001.*

Axiotis et al. "4 6 System Level Simulation Parameters for Evaluating the Interoperability of MTMR in UMTS and HIPERLAN/2", IEEE 2002.*

* cited by examiner

METHOD FOR SIMULATING COMMUNICATION NETWORKS, RELATED SIMULATOR, COMMUNICATION NETWORK, AND COMPUTER PROGRAM PRODUCT

CROSS REFERENCE TO RELATED APPLICATION

This application is a national phase application based on PCT/IT2003/000833, filed Dec. 18, 2003, the content of which is incorporated herein by reference.

FIELD OF THE INVENTION

The invention relates to techniques for simulating communication networks.

Simulation is an essential step in planning, designing, constructing and operating such networks, especially in view of optimising network performance. In particular, simulation plays an important role both in terms of verifying the planning of a new network, and in terms of upgrading and optimising the performance of an already fielded network.

The invention was devised focusing on its possible application to the simulation of telecommunication networks, such as cellular mobile radio networks, such simulations having joint nature, involving, for instance—both second generation systems (2G systems) such as GSM and GPRS, and third generation systems (3G systems) such as UMTS (CDMA2000).

Reference to said specific application, however, is not to be construed as limiting the scope of the invention, which is wholly general.

DESCRIPTION OF THE PRIOR ART

Existing system simulators can be used, for example, to simulate cellular mobile radio networks; they are characterised by an object architecture, as described for instance in WO-A-02/104055.

The object based approach entails an alternative manner of breaking a project down: in this approach, the elementary break-down unit is not the operation (the procedure) but the object, construed as a model of a real entity (an object of the real world). In such simulators are present modules or devices with the ability to simulate the behaviour of the physical network devices, as well as a highly flexible engine which allows, for example, to handle joint GSM/GPRS/UMTS simulations.

Based on the known simulation architecture, however, the implementation needed to conduct simulations where second generation system calls take place simultaneously with third generation system calls is particularly onerous and complex. Based on the prior art architecture, all devices representing the physical network devices must be designed and implemented entirely for each system to be simulated: for instance, when simulating GPRS and UMTS systems with an HTTP application, it is necessary to design and implement two versions of the HTTP application, one for the GPRS system and one for the UMTS system.

The Applicant has observed that, using the architecture disclosed by WO-A-02/104055, it is very complicated to extend the simulation capability to new systems, in particular new cellular systems to be simulated: this operation requires on each occasion the design and implementation of the modules/devices pertaining to the new systems to be inserted.

Moreover, when simulating different systems (such as GSM, GPRS and UMTS cellular systems) with the prior art simulation architecture, such a high level of processing complexity can be reached as to make simulations hardly feasible: multiple implementations (one for each system) of the different modules/devices are onerous in terms of processing times and are prone to lead to errors and/or to the saturation of the memory of the computer adapted to conduct the simulation.

SUMMARY OF THE INVENTION

The main technical problem constituting the basis for the present invention therefore consists of determining a simulation architecture which enables efficiently to conduct joint simulations of multiple telecommunication systems or networks, operating according to different standards, for instance cellular systems of the second generation (GSM and GPRS) and of the third generation (UMTS), WLAN networks and/or fixed networks, the architecture being at least in part reusable when inserting new systems.

According to the present invention, this problem is solved thanks to a method having the characteristics specifically set out in the claims that follow.

The invention also relates to a corresponding simulator, to the network resulting from the application of the method according to the invention, and to the related computer product able to be loaded into the memory of at least and electronic computer and comprising portions of software code to carry out the steps of the method according to the invention: in this context, said term shall be considered wholly equivalent to the mention of a means which is legible by a computer and which comprises instructions to control a computer system in order to implement a method according to the invention.

The reference to "at least an electronic computer" is clearly meant to highlight the possibility of embodying the solution according to the invention using a decentralised architecture.

The invention solves the technical problem described above, introducing a simulation architecture whereby it is possible, for instance, to conduct joint simulations of multiple cellular systems (such as GSM, GPRS and UMTS) or different communication networks such as WLAN networks (802.11b, Hyperlan 2, . . . ) or fixed networks.

A currently preferred embodiment of the invention entails the implementation of a method for simulating telecommunication networks by means of an object-based architecture, in which each object represents the model of an entity of the network, the simulated network being capable of corresponding to a plurality of different "systems".

In the present context, the term "system" identifies a plurality of elements, mutually co-ordinated according to a given criterion or set of criteria (i.e., a "standard") to serve a given function, i.e. to function as a communication network. For example, the term "system" here is meant to refer in distinct fashion to a "GSM system", a "GPRS system", a "UMTS system", a "WLAN system" corresponding to a given standard, and so on.

For simulation purposes, in the currently preferred embodiment of the invention, the physical network devices are subdivided into:

a first set of devices, completely independent of the system that regulates the operation of the network: the operation of the devices of said first set is thus independent of said system, a second set of devices which depend on the system under consideration: the operation of the devices included in said second set is thus specific for the system under consideration (for example, in the case of a mobile network, the second set may comprise the mobile terminal devices, each having an architecture that is characteristic of the individual system), and a third set of devices for the inter-work between the system-independent devices and the devices which do depend on the system under consideration (interworking): the operation of the devices of said third set can be associated both to said first set and to said second set and can be identical for at least some of the systems of the aforesaid plurality.

The simulation architecture comprising said sets of devices is therefore capable of allowing to simulate a network operating according to the aforesaid plurality of systems, according to a joint simulation scheme involving multiple systems.

With specific reference to the possible application of the simulation of mobile communication networks, an embodiment of the solution described herein is based on the following classification of the physical devices of a cellular network:

physical mobile radio terminal devices;

physical devices of the access network (specific physical devices of the system under consideration): BTS and BSC for GSM/GPRS; NodeB and RNC for UMTS;

physical devices of the so-called Core Network: MSC, SGSN and GGSN;

physical devices of the fixed network, such as a generic switching node (Network Switching Centre or NSC) of a circuit switched network or a generic host (HOST) in which resides an application server of a packet switched network.

The acronyms provided above (and in the remainder of the description) are well known to those versed in the art, which makes it superfluous to provide a more detailed explanation thereof in this description.

Based on the above classification, the solution described herein provides for the devices present in the simulator and relating to the physical devices of the network to be catalogued (or organised) as follows:

devices that are completely independent of the system under consideration: these are the devices that simulate the devices of the fixed network; the modules present in the devices of this group are common and the operation is identical for every system;

devices which depend on the system under consideration: these are, for example, the devices that simulate the physical devices of the access network (BTS and BSC for GSM/GPRS; NodeB and RNC for UMTS) or the mobile radio terminals of the different cellular systems; the modules present in the devices of this group are specific for each system and in particular the devices that simulate the mobile radio terminals of the different cellular systems have a particular architecture described below; and interworking device: these are the devices that simulate the physical devices of the Core Network MSC, SGSN and GGSN; said devices operate in such a way as to interact between the access modules and devices (which belong to the second set) and the fixed network modules and devices (which belong to the first set). For example, in the case of the GSM, GPRS and UMTS systems, the modules present in the devices of this group are common to the different 2G and 3G systems and their implementations are able to manage the procedures for each individual system.

In the solution described herein, each mobile radio terminal device is constituted by a part that is common for all the systems and by a part that is specific of the individual system under consideration. In particular, according the solution described herein in the mobile radio terminal device there is a grouping of the modules that simulate the behaviour of the different real protocols in the following manner:

application modules: these are common to all systems, so the same implementation is used by all radio access systems; they are grouped in the Terminal Equipment (TE);

radio access modules: these are the specific modules of the system under consideration; and core network modules: these are the modules that serve interworking functions between the application modules and the radio access modules; in the case of the GSM, GPRS, and UMTS systems, said modules have mutually equivalent operation, as the system changes.

In the case of the simulated GSM, GPRS and UMTS systems, the set of the application modules grouped in the Terminal Equipment (TE) and of the core network modules grouped in the Mobile Terminal (MT) is indicated as Mobile Unit (MU). According to the solution described herein, a single GSM, GPRS and UMTS mobile radio terminal device is constituted by the composition of the Mobile Unit (MU) and of the specific radio access modules of the system under consideration.

For example, in the case of UMTS terminal, the device is called User Equipment (UE) and it is constituted by the Mobile Unit (MU) and by the radio access modules of the UMTS system.

The architecture according to the solution described herein also allows to rationalise communication between the modules and the simulated devices.

The following situation takes place:

the application modules of the mobile radio terminals, which are independent of the simulated system and are grouped in the Terminal Equipment (TE), communicate with the modules present in the fixed network devices (NSC and HOST);

the radio access modules of the mobile radio terminal, which depend on the simulated system, communicate with the modules present in the devices of the access network (BTS and BSC for GSM/GPRS; NodeB and RNC for UMTS);

the core network modules of the mobile radio terminal, which are for interworking between the application modules and the radio access modules are grouped in the Mobile Terminal (MT), communicate with the modules present in the core network devices (MSC, SGSN and GGSN).

The architecture described herein thus allows to simulate—in particular in joint fashion—different systems (such as GSM, GPRS and UMTS cellular systems, WLAN networks and/or fixed networks) without thereby entailing such a processing complexity as to make the simulations excessively difficult, preventing the emergence of situations that are burdensome in terms of processing time and prone to lead to errors and/or to the saturation of the memory of the computer adapted to conduct the situation.

An additional characteristic of the solution described herein is that, potentially, the developed architecture is not constrained by the presence of the GSM, GPRS or UMTS systems, but can handle, in addition to fixed networks, any current and future radio access system (such as WLAN).

BRIEF DESCRIPTION OF THE ACCOMPANYING DRAWINGS

The invention shall now be described, purely by way of non limiting example, with reference to the accompanying drawings, in which.

DETAILED DESCRIPTION OF EMBODIMENTS OF THE INVENTION

Figure 1:
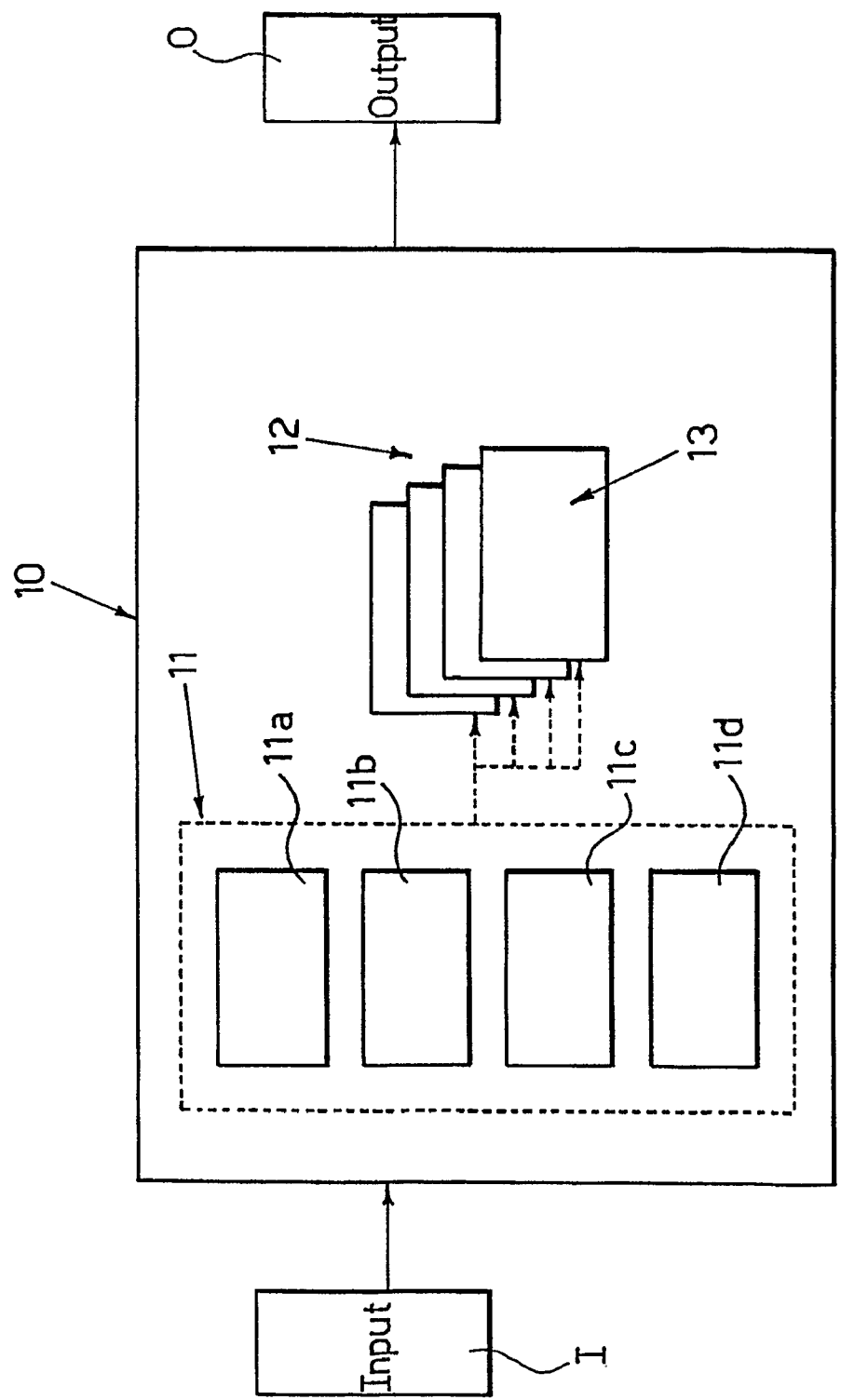
FIG. 1 is a general block diagram of a simulator according to the invention.

FIG. 1 shows the architecture of a simulator 10 comprising an engine 11 in which are present all typical functionalities for managing the simulation of a telecommunications network such as a mobile radio network, i.e.:
Parameter Manager 11a,
Event Scheduler 11b,
memory allocation manager or Factory Manager 11c, and
Statistic Manager 11d.

There is also a package device 12 which contains the various devices 13 representing the physical devices of the network and the objects pertaining to the scenario to be simulated.

Each device contains different modules, relating to the different functionalities managed by the device itself. Such a simulator can be implemented, for example, on a computer with Intel Pentium III processor and Microsoft Windows operating system, using the Microsoft Visual Studio 6.0 development environment and the ANSI C++ programming language.

The solution described herein introduces into the simulator an architecture of the devices and of the related modules that is able to allow processing operations in which voice and data telephone calls with different systems can be simulated: for example, simulations can be conducted simultaneously with GSM/GPRS users and UMTS users. The architecture described herein also takes into account the possibility that a mobile terminal may change its radio access system during the call, for example with a handover from GSM to UMTS or vice versa.

Figure 2:
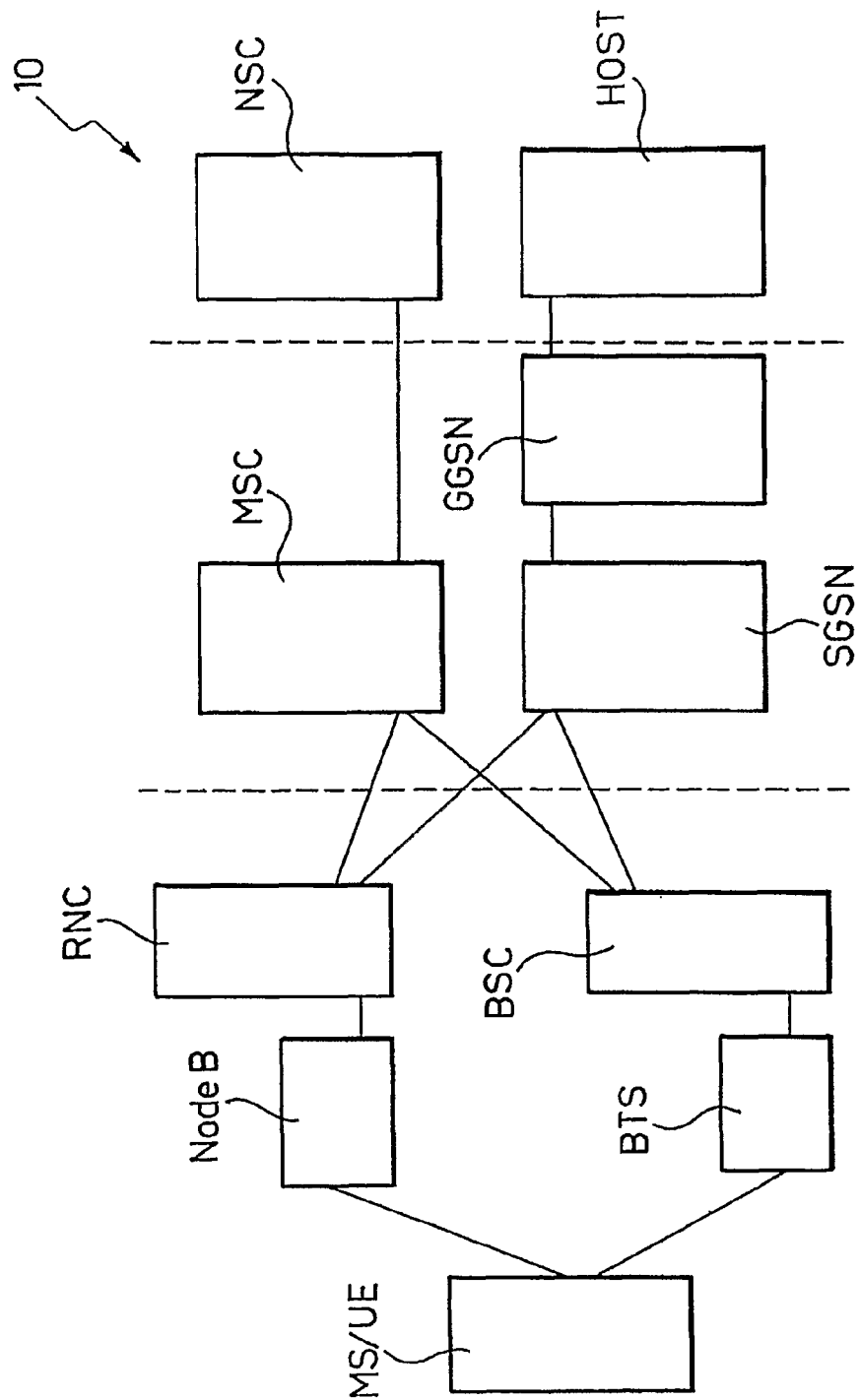
FIG. 2 is a functional block diagram illustrating the context of utilisation of the simulator of FIG. 1, and FIGS. 3 through 7 show, in the form of a so-called protocol stack, the implementation of different simulation architectures according to the solution described herein.

The architecture shown in FIG. 2 provides for the presence (at the level of simulated objects) of the following devices:
mobile radio terminal MS/UE (Mobile Station/User Equipment): this can be a mobile radio terminal that is able to manage only the GSM/GPRS (designated as MS), a mobile radio terminal that is able to manage only the UMTS system (designated as UE), or a mobile radio terminal that is able to manage the two systems GSM/GPRS and UMTS (designated as MS/UE);
devices of the GSM/GPRS access network: BTS (Base Transceiver Station) and BSC (Base Station Controller);
devices of the UMTS access network: NodeB, RNC (Radio Network Controller);
device of the Core Network for CS (Circuit Switched) services for GSM and UMTS: MSC (Mobile Switching Centre);
devices of the Core Network for PS (Packet Switched) services for GPRS and UMTS: SGSN (Serving GPRS Support Node), GGSN (Gateway GPRS Support Node);
devices of the fixed network for PS (Packet Switched) services: HOST;
devices of the fixed network for CS (Circuit Switched) services: NSC (Network Switching Centre).

In turn, each device contains within it several modules, relating to the protocol layers present in the real physical devices.

The device that simulates the mobile radio terminal has a structure that enables the joint management of different systems like GSM/GPRS and UMTS.

It is possible to simulate mobile terminals with the following modes:
mobile radio terminal MS (Mobile Station): this terminal is able to manage only the GSM/GPRS system;
mobile radio terminal UE (User Equipment): a terminal capable of managing only the UMTS system;
mobile radio terminal MS/UE: a terminal capable of managing both GSM/GPRS and UMTS systems.

The modules of the mobile terminals relating to the different radio access systems are grouped in the following way:
application modules, common to all systems: the same implementation is used by all radio access systems; they are grouped in the Terminal Equipment (TE). This group comprises the modules TE_APP_TCP/HTTP, TE_APP_UDP, TE_APP_RTP/RTSP, TE_APP_CS, TE_TCP, TE_UDP, TE_IP, TE_Codec;
Core Network modules, common to the GSM/GPRS and UMTS systems, but with partly different operation according to the system: they are grouped in the Mobile Terminal (MT). This group comprises the modules MT_SM, MT_GMM, MT_CC, MT_MM;
radio access modules, specific for the system under consideration.

Figure 3:
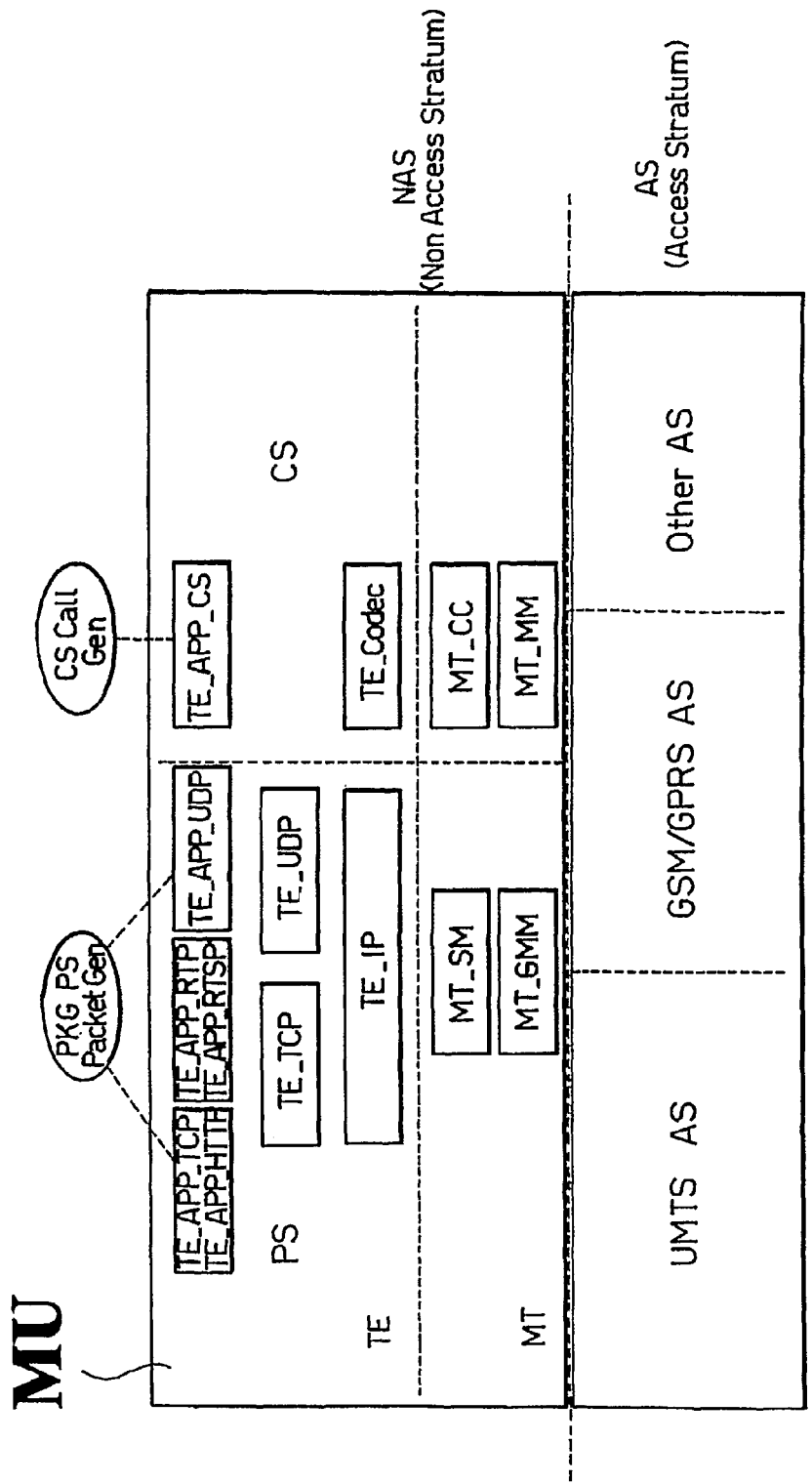

The set of TE and MT constitutes the Mobile Unit MU as shown in FIG. 3.

Figure 4:
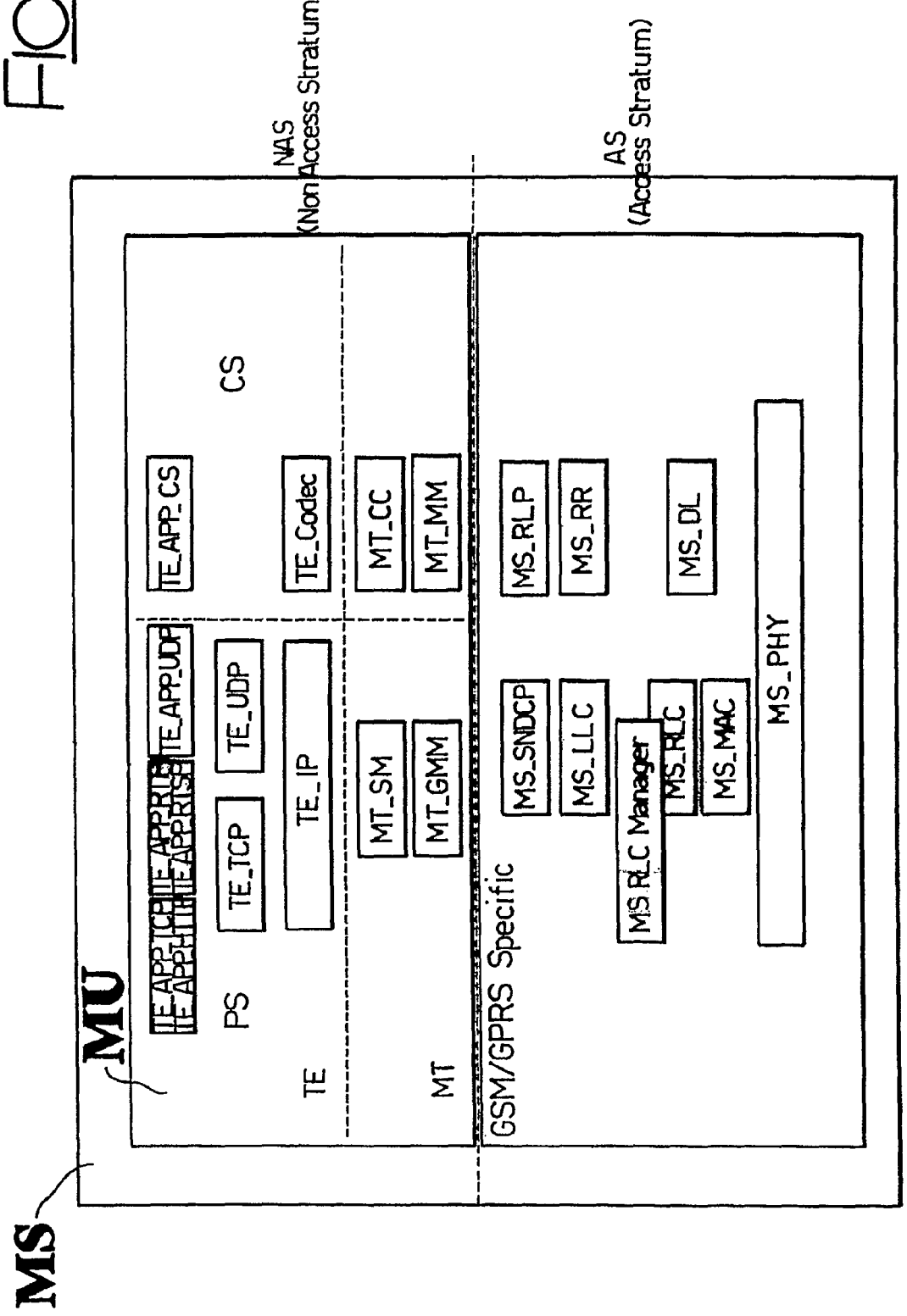

The device MU and the radio access layers of the GSM/GPRS system constitute the mobile terminal MS (Mobile Station), as shown in FIG. 4.

Figure 5:
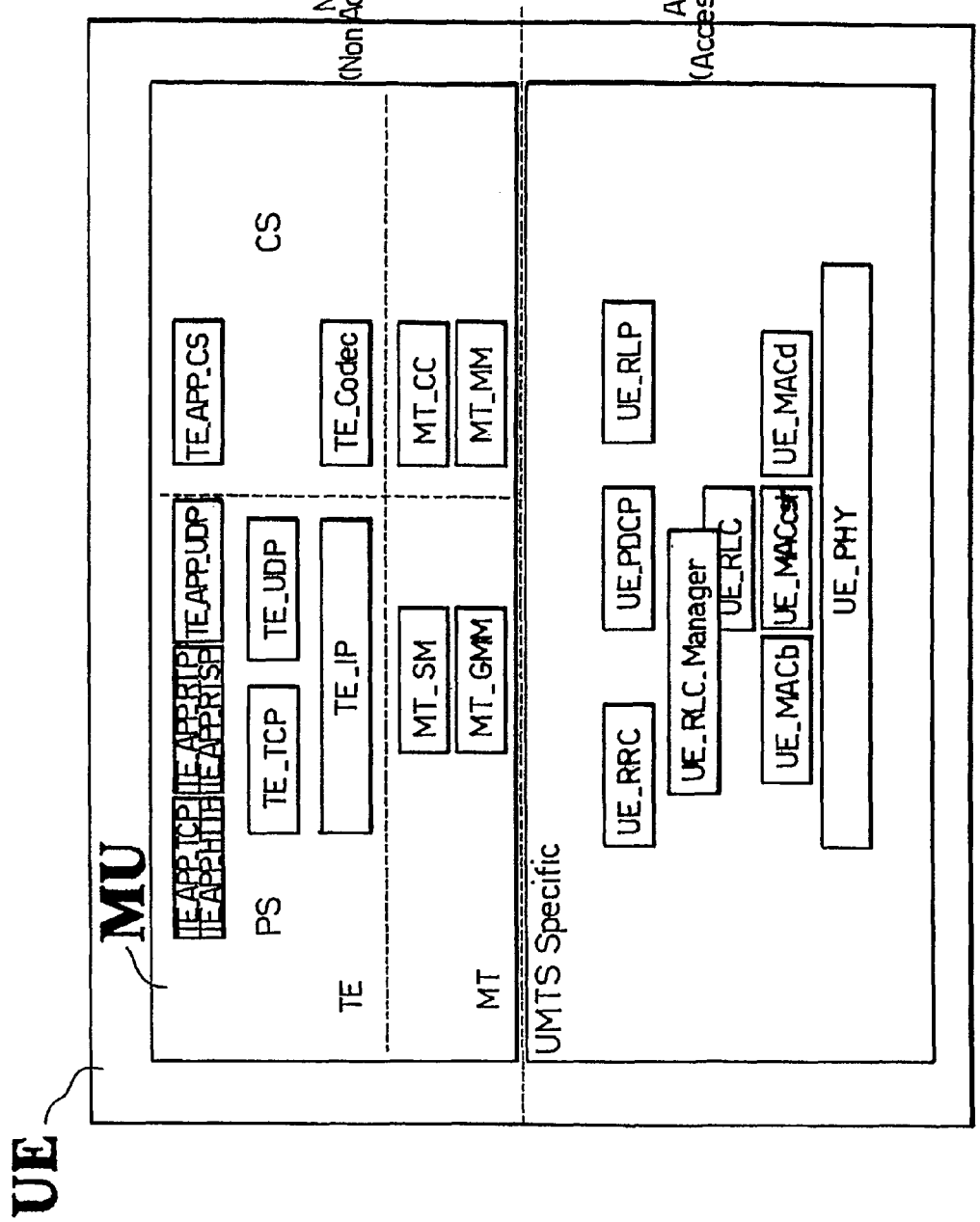

The device MU and the radio access layers of the UMTS system constitute the mobile terminal UE (User Equipment), as shown in FIG. 5.

Figure 6:
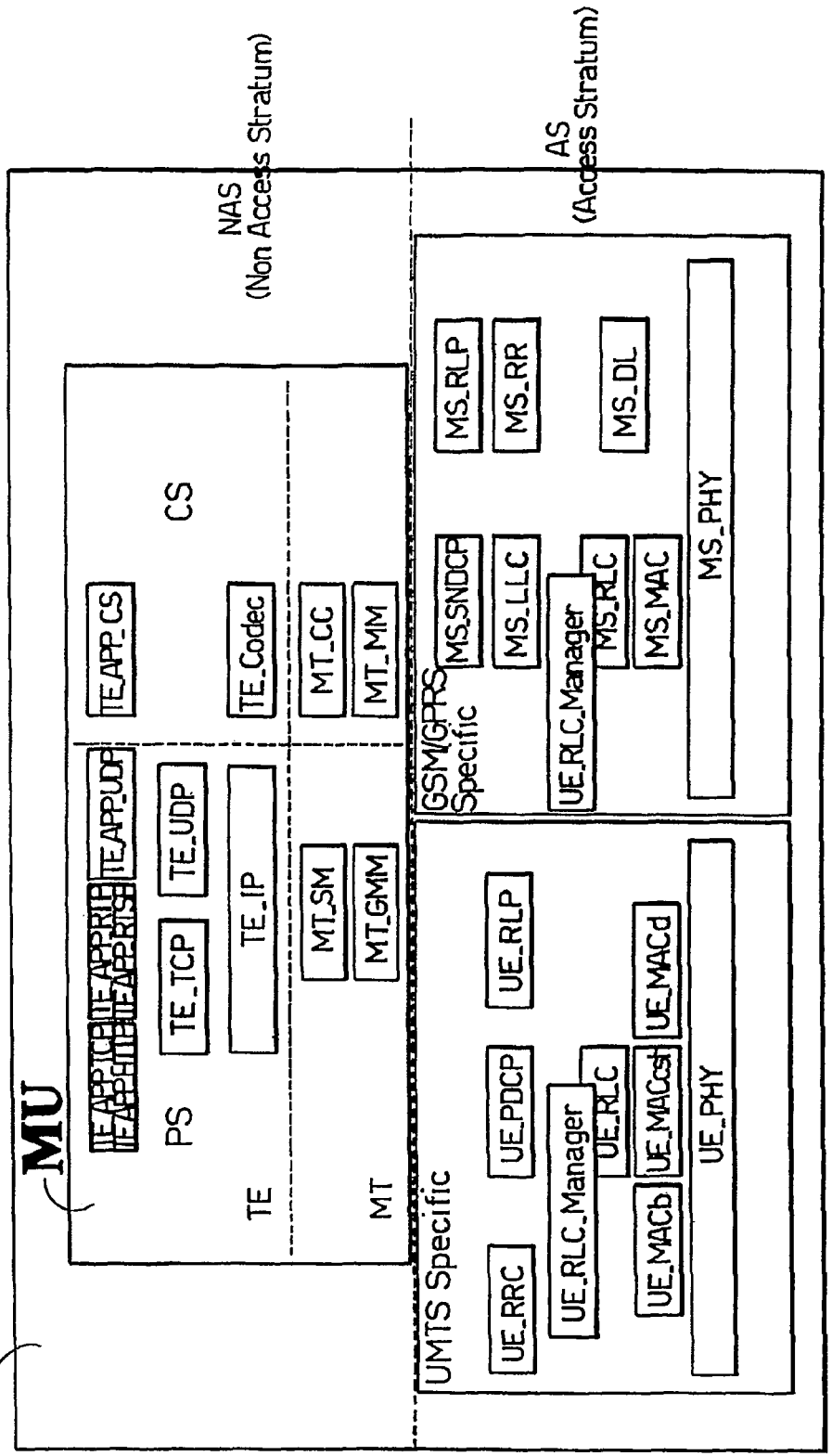

The device MU and the radio access layers of both GSM/GPRS and UMTS systems constitute the mobile terminal MS/UE (Mobile Station/User Equipment), as shown in FIG. 6.

In detail, the application modules present in the Terminal Equipment (TE) carry out the following functions:
PS Packet Generator (PKG): this is the module that simulates the generation of packet traffic originated by the terminal;
CS Call Generator: this is the module that simulates the generation of circuit switched calls originated by the terminal;
TE_APP_TCP/HTTP (TE APPlication for Transmission Control Protocol/Hyper Text Transfer Protocol): this is the module that simulates a TCP based application of packet switched services, such as an HTTP (Hyper Text Transfer Protocol) o FTP (File Transfer Protocol) application;
TE_APP_UDP (TE APPlication for User Datagram Protocol): this is the module that simulates a UDP based application of packet switched services, such as an e-mail management application;
TE_APP_RTP/RTSP (TE APPlication Real Time Protocol/Real Time Session Protocol): this is the module that simulates an application of streaming packet switched services;
TE_APP_CS (TE APPlication for Circuit Service): this is the module that simulates an application of circuit switched services, such as voice;
TE_TCP (TE Transmission Control Protocol): this is the module that simulates the TCP protocol;
TE_UDP (TE User Datagram Protocol): this is the module that simulates the UDP protocol;

TE_IP (TE Internet Protocol): this is the module that simulates the IP protocol;

TE_Codec: this is the module that simulates voice source coding.

The modules present in the Mobile Terminal (MT) carry out, in detail, the following functions:

MT_SM (MT Session Management): this is the module that manages the set-up and release of user sessions (user contexts) for packet switched services PS; its operation is similar for GPRS and UMTS;

MT_GMM (MT Gprs Mobility Management): this is the module that manages the set-up of a connection between mobile terminal and fixed network for packet switched services PS; it has a different operation between GPRS and UMTS and it is able to manage both systems independently;

MT_CC (MT Call Control): this is the module that manages the set-up and release of the call for circuit switched services CS; its operation is similar for GSM and UMTS;

MT_MM (MT Mobility Management): this is the module that manages the set-up of a connection between mobile terminal and fixed network for packet switched services CS; its operation is similar for GSM and UMTS and it is able to manage both systems independently.

The specific modules of the GSM/GPRS system present in the Mobile System (MS) carry out, in detail, the following functions:

MS_SNDCP (MS SubNetwork Dependent Convergence Protocol): this is the module that simulates the mapping of the characteristics of the various network layers on the underlying LLC module;

MS_LLC (MS Logical Link Control): this is the module that simulates the set-up of the logic connection for data transfer between MS and SGSN;

MS_RLP (MS Radio Link Protocol): this is the module that simulates the mapping of the circuit switched call from the upper layers to the GSM radio access modules;

MS_RR (MS Radio Resource): this is the module that simulates the procedures for setting up and releasing GSM/GPRS radio resources;

MS_RLC/MS_RLC_Manager (MS Radio Link Control): this is the module that simulates data transmission on the radio channel for packet data; the MS_RLC_Manager module manages the instancing of individual MS_RLC modules on a logic channel basis;

MS_MAC (MS Medium Access Control): this is the module that simulates managing access to physical resources for packet switched transmission;

MS_DL (MS Data Link): this is the module that simulates access to physical resources for circuit switched transmission;

MS_PHY (MS PHYsical layer): this is the module that simulates radio layer transmission;

The specific modules of the UMTS system, present in the User Equipment (UE) carry out, in detail, the following functions:

UE_RLP (UE Radio Link Protocol): this is the module that simulates mapping the circuit switched call from the upper layers to the UMTS radio access modules;

UE_PDCP (UE Packet Data Convergence Protocol): this is the module that simulates mapping packet switched data from the upper layers to the UMTS radio access modules;

UE_RRC (UE Radio Resource Control): this is the module that simulates the procedures for setting up and releasing GSM/GPRS radio resources;

UE_RLC/UE_RLC_Manager (UE Radio Link Control): this is the module that simulates data transmission on the radio channel; the UE_RLC_Manager module manages the instancing of individual UE_RLC modules on a Radio Bearer basis;

UE_MACb/UE_MACcsh/UE_MACd (UE Medium Access Control): this is the module that simulates managing access to physical resources;

UE_PHY (UE PHYsical layer): this is the module that simulates radio layer transmission.

The specific modules of the GSM/GPRS and UMTS systems present in the mobile terminal MS/UE (Mobile Station/User Equipment) carry out the functions set out above respectively for the MS terminal for the UE terminal.

The BTS and BSC, NodeB and RNC devices, respectively relating to the GSM/GPRS and UMTS access networks, are specific of the individual systems and have independent implementations.

In the BTS device, relating to the GSM/GPRS system, the following modules are present:

BTS_BTSM (BTS Base Transceiver Station Management): this is the module that simulates managing the signalling between BTS and BSC;

BTS_PHY (BTS PHYsical layer) this is the module that simulates radio layer transmission.

In the BSC device, relating to the GSM/GPRS system, the following modules are present:

BSC_BSSGP (BSC Base Station Subsystem Gprs Protocol): this is the module that simulates managing the signalling between BSC and SGSN;

BSC_BSSAP (BSC Base Station Subsystem Application Protocol): this is the module that simulates managing the signalling between BSC and MSC;

BSC_RLP (BSC Radio Link Protocol): this is the module that simulates mapping the circuit switched call from the upper layers to the GSM radio access modules;

BSC_RRM (BSC Radio Resource Management): this is the module that simulates managing radio resources for GSM and GPRS;

BSC_RR (BSC Radio Resource): this is the module that simulates the procedures for setting up and releasing GSM/GPRS radio resources;

BSC_RLC/BSC_RLC_Manager (BSC Radio Link Control): this is the module that simulates data transmission on the radio channel for packet switched data; the BSC_RLC_Manager module manages the instancing of individual BSC_RLC modules on a user and logic channel basis;

BSC_MAC/BSC_MAC_Manager (BSC Medium Access Control): this is the module that simulates managing access to physical resources for packet switched transmission; the BSC_MAC_Manager module manages the instancing of individual BSC_MAC modules on a cell basis;

BSC_DL/BSC_DL_Manager (BSC Data Link): this is the module that simulates access to physical resources for circuit switched transmission; the BSC_DL_Manager module manages the instancing of individual BSC_DL modules on a cell basis;

BSC_BTSM (BSC Base Transceiver Station Management): this is the module that simulates managing the signalling between BSC and BTS.

In the NodeB device, relating to the UMTS system, the following modules are present:

NodeB_RRC (NodeB Radio Resource Control): this is the module that simulates broadcasting system information;

NodeB_RLC/NodeB_RLC_Manager (NodeB Radio Link Control): this is the module that simulates data transmission on the radio channel of system information; the NodeB_RLC-Manager module manages instancing individual NodeB_RLC modules on a cell basis;

NodeB_MACb/NodeB_MACb_Manager (NodeB Medium Access Control): this is the module that simulates managing access to physical resources for the transmission of system information; the NodeB_MACb_Manager module manages the instancing of individual NodeB_MACb modules on a cell basis;

NodeB_NBAP (NodeB Application Protocol): this is the module that simulates managing the signalling between NodeB and RNC;

NodeB_PHY (NodeB PHYsical layer): this is the module that simulates radio layer transmission; it has a particular architecture able to manage the common channels (NodeB_CommonContext) and users' dedicated channels (NodeB_CommunicationContext).

In the RNC device, relating to the UMTS system, the following modules are present:

RNC_RANAP (RNC Radio Access Network Application Protocol): this is the module that simulates managing the signalling between RNC and MSC/SGSN;

RNC_GTP_U (RNC Gprs Tunneling Protocol User plane): this is the module that simulates the transmission of user data between RNC and SGSN;

RNC_RLP (RNC Radio Link Protocol): this is the module that simulates mapping the circuit switched call from the upper levels to the UMTS radio access modules;

RNC_PDCP/RNC_PDCP_Manager (RNC Packet Data Convergence Protocol): this is the module that simulates mapping packet switched data from the upper layer to the UMTS radio access modules; the RNC_PDCP_Manager modules manages the instancing of the individual modules RNC_PDCP on a user basis;

RNC_SRRM/RNC_CRRM (RNC Serving/Controlling Radio Resource Management): this is the module that simulates managing radio resources for UMTS;

RNC_RRC (RNC Radio Resource Control): this is the module that simulates the procedures for setting up and releasing UMTS radio resources;

RNC_RLC/RNC_RLC_Manager (NodeB Radio Link Control): this is the module that simulates data transmission on the radio channel destined to system information; the RNC_RLC_Manager module manages the instancing of individual RNC_RLC modules on a user and Radio Bearer basis;

RNC_MACcsh-d/RNC_MACcsh-d_Manager (RNC Medium Access Control): this is the module that simulates managing access to physical resources for the transmission of system information; the RNC_MACcsh-d_Manager module manages the instancing of RNC_MACcsh-d individual modules on a cell and user basis;

RNC_NBAP (RNC Application Protocol): this is the module that simulates managing the signalling between RNC and NodeB;

RNC_L1 (RNC Layer 1): this is the module that simulates transmitting user data to the NodeB; it has a particular architecture, capable of managing the various users with separate sessions or contexts.

In the CS and PS Core Network devices (MSC for CS, SGSN and GGSN for PS) the modules are common to the different systems and the implementations are able to manage the procedures for each individual GSM/GPRS or UMTS system.

Figure 7:
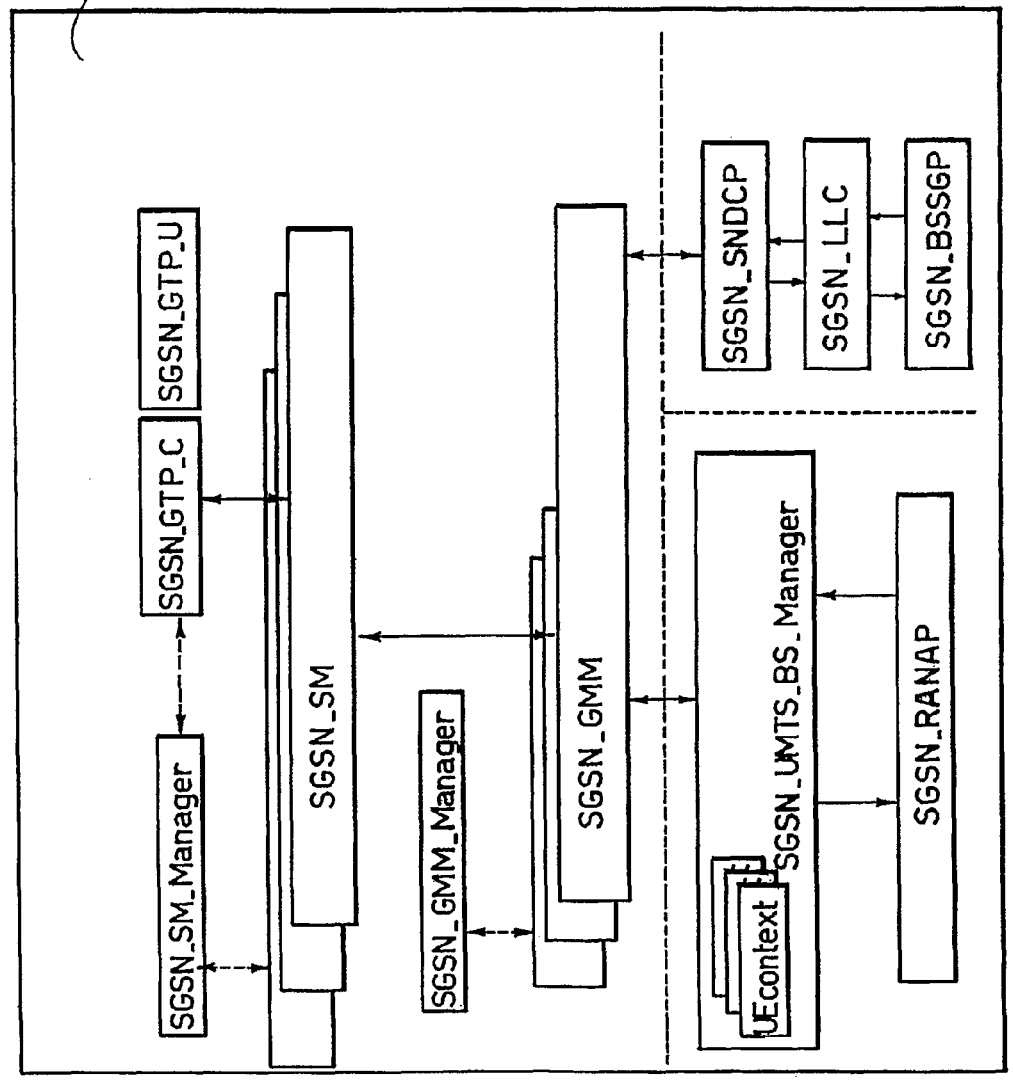

In detail, the SGSN device (see FIG. 7) contains the following modules:

SGSN_GTP_C (SGSN Gprs Tunneling Protocol Control plane): this is the module that simulates the transmission of the signalling between SGSN and GGSN; Its operation is similar for GPRS and UMTS;

SGSN_GTP_U (SGSN Gprs Tunneling Protocol User plane): this is the module that simulates the transmission of user data between SGSN and GGSN; its operation is similar for GPRS and UMTS;

SGSN_SM/SGSN_SM_Manager (SGSN Session Management): this is the module that manages the set-up and release of user sessions for packet switched services PS; its operation is similar for GPRS and UMTS; the SGSN_SM_Manager module manages the instancing of the individual modules SGSN_SM on a user basis;

SGSN_GMM/SGSN_GMM_Manager (SGSN Gprs Mobility Management): this is the module that manages the set-up of a connection between mobile terminal and fixed network for packet switched services PS; its operation is different for GPRS and UMTS and it is able to manage both systems independently; the SGSN_GMM_Manager module manages the instancing of the individual modules SGSN_GMM on a user basis;

SGSN_UMTS_BS_Manager (SGSN UMTS Bearer Service Manager): this is the module that manages the data channel between user and fixed network for packet switched services PS in the case of UMTS system; in the module, each user is managed with a different UE_context;

SGSN_RANAP (SGSN Radio Access Network Application Protocol): this is the module that simulates managing the signalling between SGSN and RNC; it is present only in the case of UMTS system;

SGSN_SNDCP (SGSN SubNetwork Dependent Convergence Protocol): this is the module that simulates mapping the characteristics of the various network levels on the underlying LLC module; it is present only in the case of GPRS system;

SGSN_LLC (SGSN Logical Link Control): this is the module that simulates the set-up of the logic connection for transferring data between MS and SGSN; it is present only in the case of GPRS system;

SGSN_BSSGP (SGSN Base Station Subsystem GPRS Protocol): this is the module that simulates managing the signalling between SGSN and BSC; it is present only in the case of system GPRS.

In detail, the device GGSN contains the following modules:

GGSN_IP/GGSN_IP_Manager (GGSN Internet Protocol): this is the module that simulates the protocol IP. Its operation is similar for GPRS and UMTS;

GGSN_PDP_Context_Manager (GGSN Packet Data Protocol Context Manager): this is the module that stores user contexts for packet switched services PS; its operation is similar for GPRS and UMTS;

GGSN_GTP_C (GGSN Gprs Tunneling Protocol Control plane): this is the module that simulates the transmission of signalling between GGSN and SGSN; its operation is similar for GPRS and UMTS;

GGSN_GTP_U (GGSN Gprs Tunneling Protocol User plane): this is the module that simulates the transmission of user data between GGSN and SGSN; its operation is similar for GPRS and UMTS.

In detail, the MSC device contains the following modules:

MSC_Codec: this is the module that simulates adapting voice source coding to the coding used in the radio environment; its operation is similar for GSM and UMTS;

MSC_CC/MSC_CC_Manager (MSC Call Control): this is the module that manages the set-up and release of the call for circuit switched services CS; its operation is similar for GSM and UMTS. The MSC_CC_Manager module manages the instancing of the individual modules MSC_CC on a user basis;

MSC_MM/MSC_MM_Manager (MSC Mobility Management): this is the module that manages the set-up of a connection between mobile terminal and fixed network for packet switched services PS; its operation is similar for GSM and UMTS and it can manage both systems independently. The MSC_MM_Manager module manages the instancing of the individual modules MSC_MM on a user basis;

MSC_UMTS_BS_Manager (MSC UMTS Bearer Service Manager): this is the module that manages the data channel between user and fixed network for packet switched services PS in the case of UMTS system; in the module, each user is managed with a different UE_context;

MSC_RANAP (MSC Radio Access Network Application Protocol): this is the module that simulates managing the signalling between MSC and RNC; it is present only in the case of UMTS system;

MSC_BSSAP (MSC Base Station Subsystem Application Protocol): this is the module that simulates managing the signalling between BSC and MSC; it is present only in the case of GSM system.

In fixed network devices (NSC and HOST) the modules are common and operation is identical for each system under consideration.

In detail, the NSC device contains the following modules:

CS Call Generator: this is the module that simulates the generation of circuit switched calls originated by the network;

NSC_APP_CS/NSC_APP_CS_Manager (NSC APPlication Circuit Service): this is the module that simulates an application of circuit switched services, come la voce; the NSC_APP_CS_Manager module manages the instancing of the individual modules NSC_APP_CS on a user basis.

In detail, the device HOST contains the following modules:

PS Packet Generator (PKG): this is the module that simulates the generation of packet traffic originated by the network;

PSS Stream Generator (PSSG): this is the module that simulates the generation of streaming packet traffic;

HOST_Streaming_Server: this is the module that simulates a server of streaming packet switched services, where videos reside;

HOST_APP_TCP/HOST_APP_TCP_Manager (HOST APPlication Transport Control Protocol): this is the module that simulates a TCP based application of packet switched services, such as an FTP (File Transfer Protocol) application; the HOST_APP_TCP_Manager module manages the instancing of individual HOST_APP_TCP modules on a user basis;

HOST_HTTP/HOST_HTTP_Manager (HOST Hyper Text Transfer Protocol): this is the module that simulates an http application; the HOST_HTTP_Manager module manages the instancing of individual HOST_HTTP modules on a user basis;

HOST_APP_UDP (HOST APPlication User Datagram Protocol): this is the module that simulates a UDP based application of packet switched services, such as an e-mail management application;

HOST_APP_RTP/HOST_APP_RTSP (HOST APPlication Real Time Protocol/Real Time Session Protocol): this is the module that simulates an application of streaming packet switched services;

HOST_TCP/HOST_TCP_Manager (HOST Transport Control Protocol): this is the module that simulates the TCP protocol; the HOST_TCP_Manager module manages the instancing of individual HOST_TCP modules on a user basis;

HOST_UDP (HOST User Datagram Protocol): this is the module that simulates the UDP protocol;

HOST_IP (HOST Internet Protocol): this is the module that simulates the IP protocol.

The simulator architecture described herein can be implemented with any type of computer, such as Intel, SUN, Apple, . . . and with any operating (Windows, Linux, Unix, MAC OS . . . ). Use of the ANSI C++ programming language is only one of several available options; the simulator can also be implemented in other programming languages, such as Java, Delphi, Visual Basic, . . . . Currently, the selection of the ANSI C++ is considered preferential because it is dictated by the good programming flexibility offered by said programming language and by the high level of performance achievable in the finished program in terms of speed of execution.

The architecture of the devices and of the related modules, in general, allows to use different systems from those set out herein, such as GSM/GPRS and UMTS: any future cellular system can be simulated.

What is particularly noteworthy is that the modules of the mobile terminals relating to the different radio access systems have been grouped in the manner set out above:

application modules, common to all systems: the same implementation is used by all radio access systems; they are grouped in the Terminal Equipment (TE). This group comprises the modules TE_APP_TCP/HTTP, TE_APP_UDP, TE_APP_RTP/RTSP, TE_APP_CS, TE_TCP, TE_UDP, TE_IP, TE_Codec;

radio access modules: these are specific of the system under consideration;

Core Network modules, common to the GSM/GPRS and UMTS systems, but with partly different operation according to the system: they are grouped in the Mobile Terminal (MT); This group comprises the modules MT_SM, MT_GMM, MT_CC, MT_MM.

The architecture according to the present invention thus allows to rationalise the simulation of a network comprising a plurality of systems.

According to the communication between the modules and the simulated devices:

the application modules of the mobile radio terminal, which are independent of the simulated system and are grouped in the Terminal Equipment, communicate with the modules present in the devices of the fixed network;

the radio access modules of the mobile radio terminal, which are dependent on the simulated system, communicate with the modules present in the devices of the access network;

the core network modules of the mobile radio terminal, which are for interworking between the application modules and the radio access modules and are grouped in the Mobile Terminal, communicate with the modules present in the core network devices.

In the case of cellular systems not corresponding or not directly deriving from current standards (GSM, GPRS, UMTS) expressly referred in the description provided herein by way of example, the application modules grouped in the Terminal Equipment (TE) will remain identical, because they are wholly independent of the system in use. The core network modules grouped in the Mobile Terminal (MT) may be modified or replaced, depending on the characteristics of the systems under consideration. Lastly, the radio access modules (and only these modules) will have to be completely designed because they are specific of the system under consideration.

The above can also be extended to modules that simulate protocol layers of the fixed network where, as described above, there are the following groupings:
- application modules: all the modules present in the HOST and NSC devices;
- radio access modules: all the modules present in the BTS, BSC, NodeB, RNC devices;
- Core Network modules: all the modules present in the SGSN, GGSN, MSC devices.

In the case of cellular systems not corresponding or not directly deriving from current standards (GSM, GPRS, UMTS) expressly referred in the description provided herein by way of example, the application modules present in the HOST and NSC devices will remain identical, because they are wholly independent of the system in use. The core network modules present in the SGSN, GGSN and MSC devices may be modified or replaced, depending on the characteristics of the systems under consideration. Lastly, the radio access modules (and only these modules) will have to be completely designed because they are specific of the system under consideration.

It is therefore readily apparent that, without altering the principle of the invention, the construction details and the embodiments may vary widely relative to what is described and illustrated herein, without thereby departing from the scope of the present invention, as defined in the appended claims.

The invention claimed is:

1. A method for simulating a communication network on a digital computer by means of an object based architecture in which each object represents a device of the network, the simulated network being capable of operating in accordance with a plurality of different telecommunication systems, comprising:
   identifying a first set of system-independent devices, operation of the system-independent devices being identical for each of the plurality of different telecommunication systems;
   identifying a second set of system-dependent devices, operation of the system-dependent devices in said second set being specific for one of the plurality of different telecommunication systems, the second set including mobile terminal devices;
   identifying a third set of interaction devices, the interaction devices of said third set being able to communicate and interact with said system-independent devices and with said system-dependent devices;
   assigning to each device software modules relating to different functionalities managed by the device; and
   modeling, on the digital computer, the mobile terminal devices as a grouping of modules simulating behavior of different protocol layers present in the mobile terminal devices, wherein the modules comprise:
      application modules having a same implementation for the plurality of different telecommunication systems, access modules being specific for the one of the plurality of different telecommunication systems, and
      core network modules being used interchangeably by each of the plurality of different telecommunication systems but with partly different operation for each of the plurality.

2. The method as claimed in claim 1, further comprising providing one of a generic switching node (NSC) of a circuit-switched network and a generic host (HOST) holding an application server of a packet-switched network in said first set.

3. The method as claimed in claim 1, further comprising providing one of a mobile services switching center (MSC), a serving GPRS support node (SGSN), and a gateway GPRS support node (GGSN) in said third set.

4. The method as claimed in claim 1, further comprising providing one of a BTS and BSC for a GSM/GPRS system and a Node B and an RNC for a UMTS system in said second set.

5. The method as claimed in claim 1, wherein the modules of said mobile terminal devices comprise a part that is common to all the systems of said plurality and a part that is specific for the one of the plurality.

6. The method as claimed in claim 3, further comprising configuring the set of said application modules and of said core network modules in a mobile unit.

7. The method as claimed in claim 6, further comprising configuring said mobile terminal devices as constituted by the composition of said mobile unit and of specific access modules of the one of the plurality of different telecommunication systems.

8. The method as claimed in claim 1, further comprising at least one of the group:
   making the application modules of said mobile terminal devices communicate with modules present in the system-independent devices of said first set;
   making modules present in the interaction devices of said third set communicate with the modules present in said mobile terminal devices; and
   making the access modules of said mobile terminal devices communicate with modules present in the system-dependent devices of said second set.

9. A simulator for simulating a communication network on a digital computer by means of an object based architecture in which each object represents a device of the network, the simulated network being capable of operating in accordance with a plurality of different telecommunication systems, comprising:
   identifying a first set of system-independent devices, operation of the system-independent devices being identical for each of the plurality of different telecommunication systems;
   identifying a second set of system-dependent devices, operation of the system-dependent devices in said second set being specific for one of the plurality of different telecommunication systems, the second set including mobile terminal devices;
   identifying a third set of interaction devices, the interaction devices of said third set being able to communicate and interact with said system-independent devices and with said system-dependent devices;
   assigning to each device software modules relating to different functionalities managed by the device; and
   modeling, on the digital computer, the mobile terminal devices as a grouping of modules simulating behavior of different protocol layers present in the mobile terminal devices, wherein the modules comprise:

application modules having a same implementation for the plurality of different telecommunication systems, access modules being specific for the one of the plurality of different telecommunication systems, and core network modules being used interchangeably by each of the plurality of different telecommunication systems but with partly different operation for each of the plurality.

10. The simulator as claimed in claim 9, wherein said first set comprises one of a generic switching node (NSC) of a circuit-switched network and a generic host (HOST) holding an application server of a packet-switched network.

11. The simulator as claimed in claim 9, wherein said third set comprises one of a mobile services switching center (MSC), a serving GPRS support node (SGSN), and a gateway GPRS support node (GGSN).

12. The simulator as claimed in claim 9, wherein said second set comprises one of a BTS and BSC for a GSM/GPRS system and a Node B and an RNC for a UMTS system.

13. The simulator as claimed in claim 9, wherein the modules of said mobile terminal devices comprise a part that is common to all the systems of said plurality and a part that is specific for the one of the plurality.

14. The simulator as claimed in claim 11, wherein:

the set of said application modules and of said core network modules is configured as a mobile unit.

15. The simulator as claimed in claim 14, wherein said mobile terminal devices comprise the composition of said mobile unit and of specific access modules of the one of the plurality of different telecommunication systems.

16. The simulator as claimed in claim 9, wherein communications are allowed according to at least one of the operations of the group:

making the application modules of said mobile terminal devices communicate with modules present in the system-independent devices of said first set;

making modules present in the interaction devices of said third set communicate with the modules present in said mobile terminal devices; and making the access modules of said mobile terminal devices communicate with modules present in the system-dependent devices of said second set.

17. A non-transitory computer-readable medium storing instructions for executing a software program capable of being loaded in the memory of at least an electronic computer and comprising portions of software code for performing a method for simulating a communication network on a digital computer by means of an object based architecture in which each object represents a device of the network, the simulated network being capable of operating in accordance with a plurality of different telecommunication systems, the method comprising:

identifying a first set of system-independent devices, operation of the system-independent devices being identical for each of the plurality of different telecommunication systems;

identifying a second set of system-dependent devices, operation of the system-dependent devices in said second set being specific for one of the plurality of different telecommunication systems, the second set including mobile terminal devices;

identifying a third set of interaction devices, the interaction devices of said third set being able to communicate and interact with said system-independent devices and with said system-dependent devices;

assigning to each device software modules relating to different functionalities managed by the device; and modeling, on the digital computer, the mobile terminal devices as a grouping of modules simulating behavior of different protocol layers present in the mobile terminal devices, wherein the modules comprise:

application modules having a same implementation for the plurality of different telecommunication systems, access modules being specific for the one of the plurality of different telecommunication systems, and core network modules being used interchangeably by each of the plurality of different telecommunication systems but with partly different operation for each of the plurality.

* * * * *